United States Patent [19]
Kempf et al.

[11] Patent Number: 5,812,774
[45] Date of Patent: Sep. 22, 1998

[54] SYSTEM FOR TRANSMITTING DATA PACKET FROM BUFFER BY READING BUFFER DESCRIPTOR FROM DESCRIPTOR MEMORY OF NETWORK ADAPTER WITHOUT ACCESSING BUFFER DESCRIPTOR IN SHARED MEMORY

[75] Inventors: Mark F. Kempf, Sudbury; Henry Sho-Che Yang, Andover, both of Mass.

[73] Assignee: Cabletron Systems, Inc., Rochester, N.H.

[21] Appl. No.: 779,728

[22] Filed: Jan. 6, 1997

Related U.S. Application Data

[63] Continuation of Ser. No. 203,547, Mar. 1, 1994, abandoned.
[51] Int. Cl.$^6$ .................................................... G06F 13/00
[52] U.S. Cl. ........................................................ 395/200.42
[58] Field of Search ............................ 395/200.2, 200.07, 395/250, 421.1, 823, 200.42, 200.32, 200.8, 872

[56] References Cited

U.S. PATENT DOCUMENTS

| | | | |
|---|---|---|---|
| 5,155,830 | 10/1992 | Kurashige | 395/844 |
| 5,179,665 | 1/1993 | Roslund et al. | 395/200.45 |
| 5,289,470 | 2/1994 | Chang et al. | 379/89 |
| 5,299,313 | 3/1994 | Petersen et al. | 395/200.64 |
| 5,303,347 | 4/1994 | Gagne et al. | 395/200.45 |
| 5,386,524 | 1/1995 | Lary et al. | 711/206 |
| 5,400,326 | 3/1995 | Smith | 370/401 |
| 5,457,681 | 10/1995 | Gaddis et al. | 370/402 |
| 5,600,814 | 2/1997 | Gahan et al. | 395/307 |

OTHER PUBLICATIONS

"FDDI Data Link Development," Henry S. Yang, Barry A. Spinney, Stephen Towning, Digital Technical Journal, vol. 3, No. 2, Spring 1991.
"Design of the DEC LANcontroller 400 Adapter," Richard E. Stockdale, Judy B. Weiss, Digital Technical Journal, vol. 3, No. 3, Summer 1991.

Primary Examiner—Moustafa M. Meky
Attorney, Agent, or Firm—Christine M. Kuta; Gary E. Ross

[57] ABSTRACT

The problems of meeting tight latency requirement while keeping network design low in cost and complexity are solved by the present invention of a network controller with a transaction logic block and a descriptor memory. The invention allows the data buffers and the buffer descriptors to be located in two physically separate memory subsystems. Data buffers can reside in a main system memory which are shared by other system clients. The buffer descriptors, which typically require significantly less memory space than data buffers, can reside in a special dedicated memory which can be low cost. The invention provides a method to allow buffer descriptors to be located in a low latency memory, which can be local to the network adapter. The data buffers can be located in a system shared memory. This design allows system shared resources, e.g. main system memory or bus, to be designed with relatively longer delay budget. This provides a significant system benefit since the buffer memory size is typically many orders of magnitude larger than the buffer descriptor memory size. The invention also provides a method where a system bus supports a priority service where low latency is guaranteed. In this embodiment, the data buffers and the descriptors can reside in a shared memory. The network controller uses the priority service when accessing the buffer descriptors.

11 Claims, 7 Drawing Sheets

SYSTEM FOR TRANSMITTING DATA PACKET FROM BUFFER BY READING BUFFER DESCRIPTOR FROM DESCRIPTOR MEMORY OF NETWORK ADAPTER WITHOUT ACCESSING BUFFER DESCRIPTOR IN SHARED MEMORY

This application is a continuation, of application Ser. No. 08/203,547, filed Mar. 1, 1994, now abandoned.

FIELD OF THE INVENTION

The present invention relates generally to communications networks, and more particularly, to efficient, flexible network controllers.

BACKGROUND OF THE INVENTION

In a communications network, a network controller located in a network adapter manages transmission and reception of data packets by transferring data between the network and a shared memory subsystem. The shared memory is used by several different devices including the system CPU, I/O devices and disks as well as the network. The network adapter accesses the shared memory by a shared system bus. Typically, transmit and receive data packets are stored in buffers in the shared memory subsystem. Buffer descriptors define the specific information about each data packet, e.g. type, length and size. The buffer descriptors are typically located in the shared memory subsystem along with the data packets. To transmit or receive a data packet, the network controller must access the buffer descriptor of the particular data packet, transfer the data for the packet from or to a buffer, and then update the buffer descriptor with the new status.

Repeated accesses to the buffer descriptors are necessary when the data packet is stored in several buffers. On a system with a shared bus and a shared memory, under load, the shared resources can be congested causing a long access delay. A long access delay before a transaction can be executed can be problematic where there are multiple accesses to buffer descriptors for each data buffer. When processing back-to-back packets, repeated accesses to buffer descriptors is also critical. To process a packet, a buffer descriptor must be read first to find out where the buffers are, the buffer must be accessed, and at the end of the access the buffer descriptor must be updated by a write transaction. For example, in contemporary high performance communications systems which use high speed memory or bus with burst mode support, each transaction contains multiple data cycles at high speed. Although these memory or bus subsystems have fast cycle time, there may be a relatively long access delay to a shared memory on a shared bus before a transaction can be executed. For communications systems with long delay, multiple accesses to the buffer descriptor can adversely affect the performance of the system, especially for back to back arrival of small data packets.

In a communications network adapter, a shared memory subsystem is connected to a network controller chip by a shared system bus. Such a design requires that the system bus and memory satisfy the network controller chip's latency and bandwidth requirements. Bus latency is the delay to access the shared memory and shared bus, and it is measured by the time elapsed from a bus request to a bus grant. Most network controller chips have strict latency requirements, which impose limitations on the number and types of devices that can share system resources. For example, most Ethernet controller chips are designed with a relatively small internal data buffer for transmit and receive. One ethernet controller chip, the Lance chip, AMD AM79C960, has a 48 byte internal buffer and relatively strict system bus latency requirements. The Lance chip requires the system to guarantee a bus latency of no greater than 6 microseconds for a single buffer per packet case.

For systems that cannot meet the tight latency requirement imposed by the network controller chip, the network adapter may have to buffer the entire packet in a separate local memory. Such a design can add relatively high cost and complexity.

It remains desirable to have a communications network adapter which meets tight controller chip latency requirements while handling high speed data transactions utilizing multiple buffers to achieve high utilization of system resources.

SUMMARY OF THE INVENTION

The problems of meeting tight bus latency requirements while keeping network design low in cost and complexity are solved by the present invention of a network controller with a transaction logic block and a descriptor memory.

The invention allows the data buffers and the buffer descriptors to be located in two physically separate memory subsystems. Data buffers can reside in a main system memory, and the main system memory is shared by other system clients. The buffer descriptors, which typically require significantly less memory space than data buffers, can reside in a special dedicated memory which can be low cost.

The invention provides a method to allow buffer descriptors to be located in a low latency memory, which can be local to the network adapter. The data buffers can be located in a system shared memory. This design allows system shared resources, e.g. main system memory or bus, to be designed with a relatively longer delay budget. This provides a significant system benefit since the buffer memory size is typically many orders of magnitude larger than the buffer descriptor memory size. For example, an Ethernet chip based design can have a buffer space of approximately 380 Kbytes (2*128*1518 bytes) and a buffer descriptor space of 2 Kbytes (2*4*2*128 bytes). A dedicated buffer descriptor memory can be designed using a low cost memory. By incorporating the present invention, a system based on the exemplary Ethernet chip can tolerate about 7.3 microseconds of bus latency, compared to about 6 microseconds without this invention.

The invention also provides a method where a system bus supports a priority service where low latency is guaranteed. In this embodiment, the data buffers and the descriptors can reside in a shared memory. The network controller uses the priority service when accessing the buffer descriptors.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
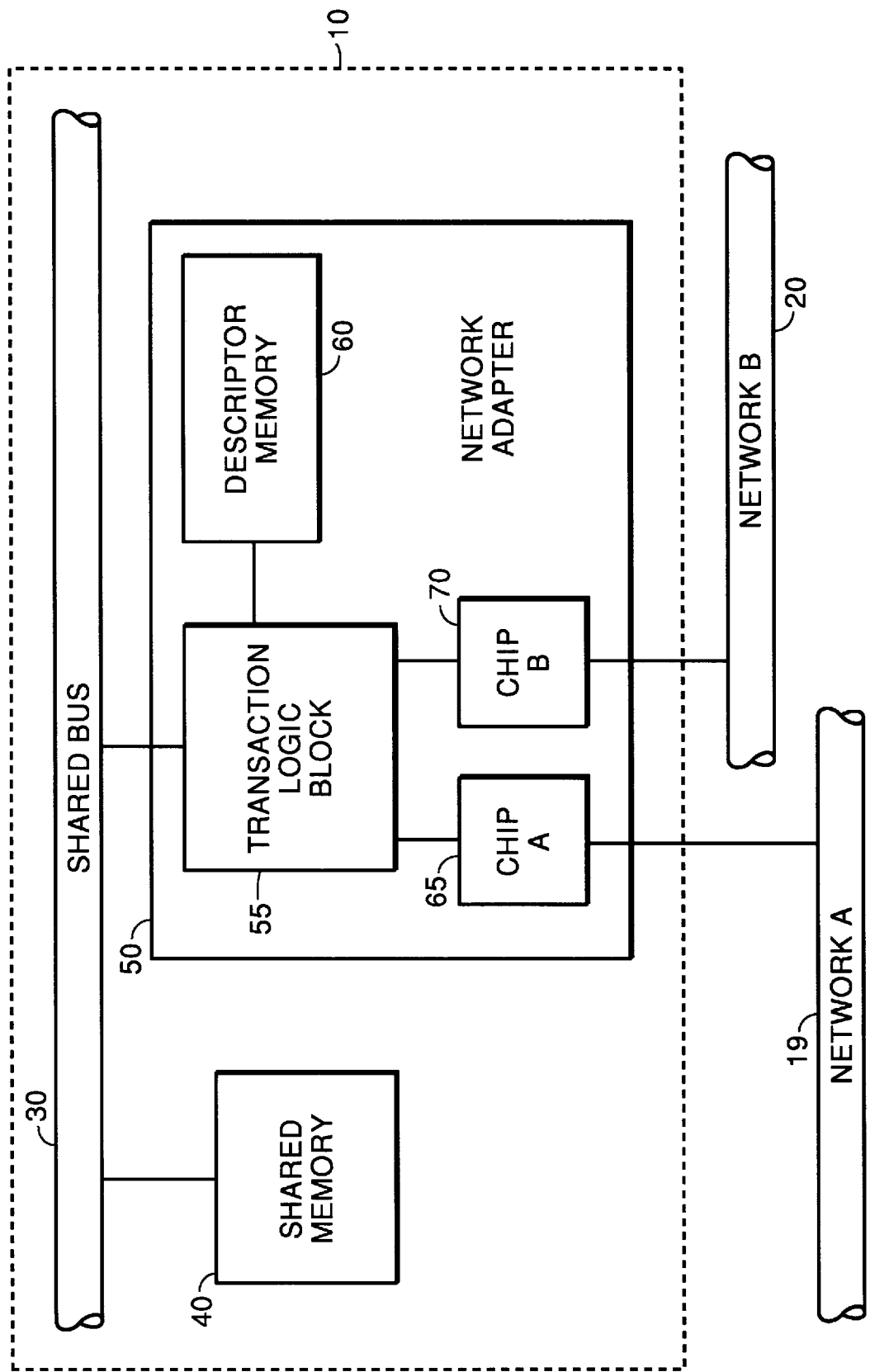
FIG. 1 is a network with a shared memory and a network controller.

FIG. 1 shows a first exemplary embodiment of the invention, a subsystem 10 on a communications network A 19 and a communications network B 20. The subsystem 10 has a shared bus 30, a shared memory 40 and a network adapter 50. The network adapter 50 has a transaction logic block 55, a descriptor memory 60, network controller chip A 65 and network controller chip B 70. The transaction logic block 55 is an interface to the shared bus 30 for data transfers to and from the shared memory 40. The transaction logic block 55 also interfaces to the descriptor memory 60, a local memory for buffer descriptor transfers. In the exemplary embodiment of the invention, the shared bus 30 is a high-speed, 32 bit data bus running at 25 MHz. Also in the exemplary embodiment of the invention, there are two network controller chips 65, 70 connected to two networks 19, 20. The invention may be employed using for example only one network and network controller chip or using more than two networks and network controller chips.

The network adapter 50 manages the transmission and reception of data packets from the network 20 by transferring data packets between the network 20 and the shared memory 40, where the data packets are stored. Each data packet is defined by buffer descriptors which, in the preferred embodiment of the present invention, are stored in the descriptor memory 60 in the network adapter 50. The buffer descriptor contains information about the data packet such as the data type, the length and the location in memory. A data packet has at least one buffer descriptor and may have many buffer descriptors. To transmit or receive a data packet on one of the networks 19, 20, the associated network controller chip 65, 70 accesses each buffer descriptor of the data packet, transfers the data for the data packet from or to the shared memory 40, and then updates the buffer descriptor with the status. Accessing data and accessing buffer descriptors are separate bus transaction types. The transaction logic block 55 decodes the bus transaction type from the output of the network controller chips 65, 70 and determines whether the bus transaction type is a data transfer or a buffer descriptor transfer. If the transaction is a data transfer, the transaction logic block 55 directs the request towards the shared bus 30 and shared memory 40. If the transaction is a buffer descriptor transfer, the transaction logic block 55 directs the request towards the descriptor memory 60.

Access to the descriptor memory 60 is fast because it is local and no bus resources are required. By using a local memory for buffer descriptor transfers, the performance of the subsystem 10 is not adversely affected by multiple accesses to buffer descriptors, and the latency requirements imposed by the network controller chips 65, 70 are met.

Figure 2:
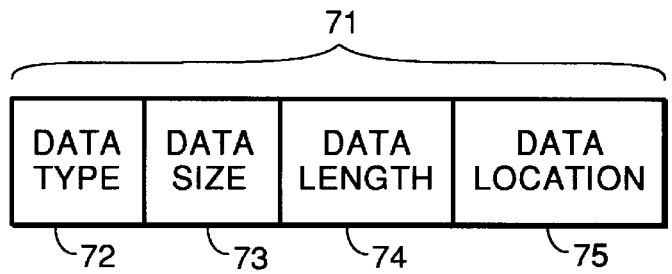
FIG. 2 shows an exemplary buffer descriptor.

FIG. 2 shows an exemplary buffer descriptor 71. The exemplary buffer descriptor 71 has four fields, a data type field 72, a data size field 73, a data length field 74 and a data location field 75.

Figure 3:
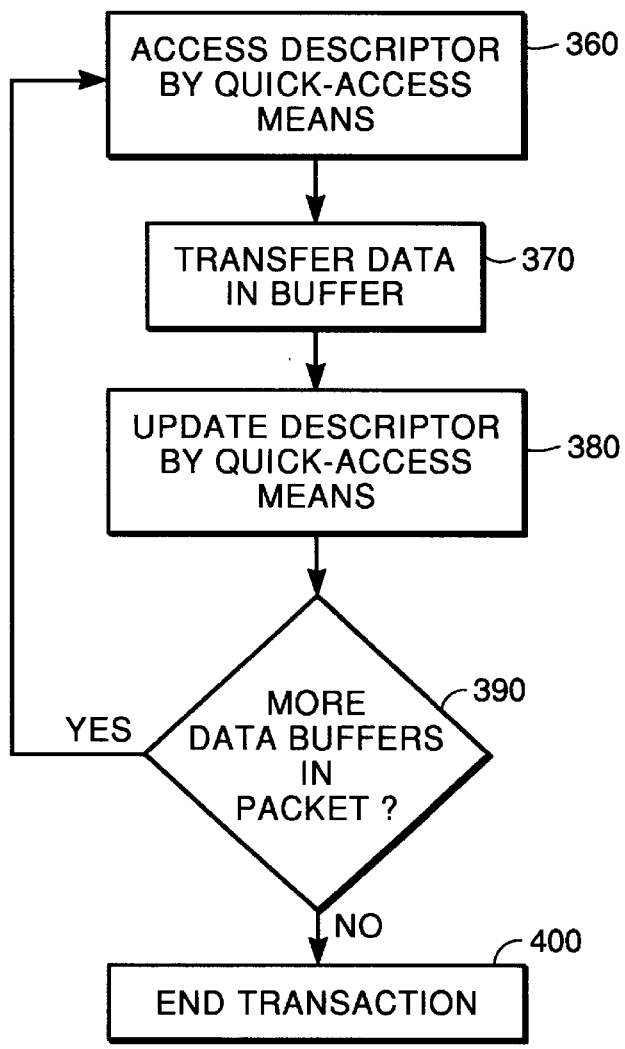
FIG. 3 is a flow chart of data transmit/receive in the present invention.

Data is transmitted/received in the present invention as shown in the flow chart in FIG. 3. When data is to be transmitted or received, the transaction logic accesses the buffer descriptor by a quick-access means, e.g. a local descriptor memory, as represented in block 360. The data is transferred to or from a buffer in the shared memory, block 370. The buffer descriptor is updated by the quick-access means, block 380. The transaction logic checks for more buffers in the data packet, decision block 390. If there are more buffers in the data packet, the next buffer descriptor is accessed, block 360. If there are no more buffers of data left, the transaction ends, block 400.

Figure 4:
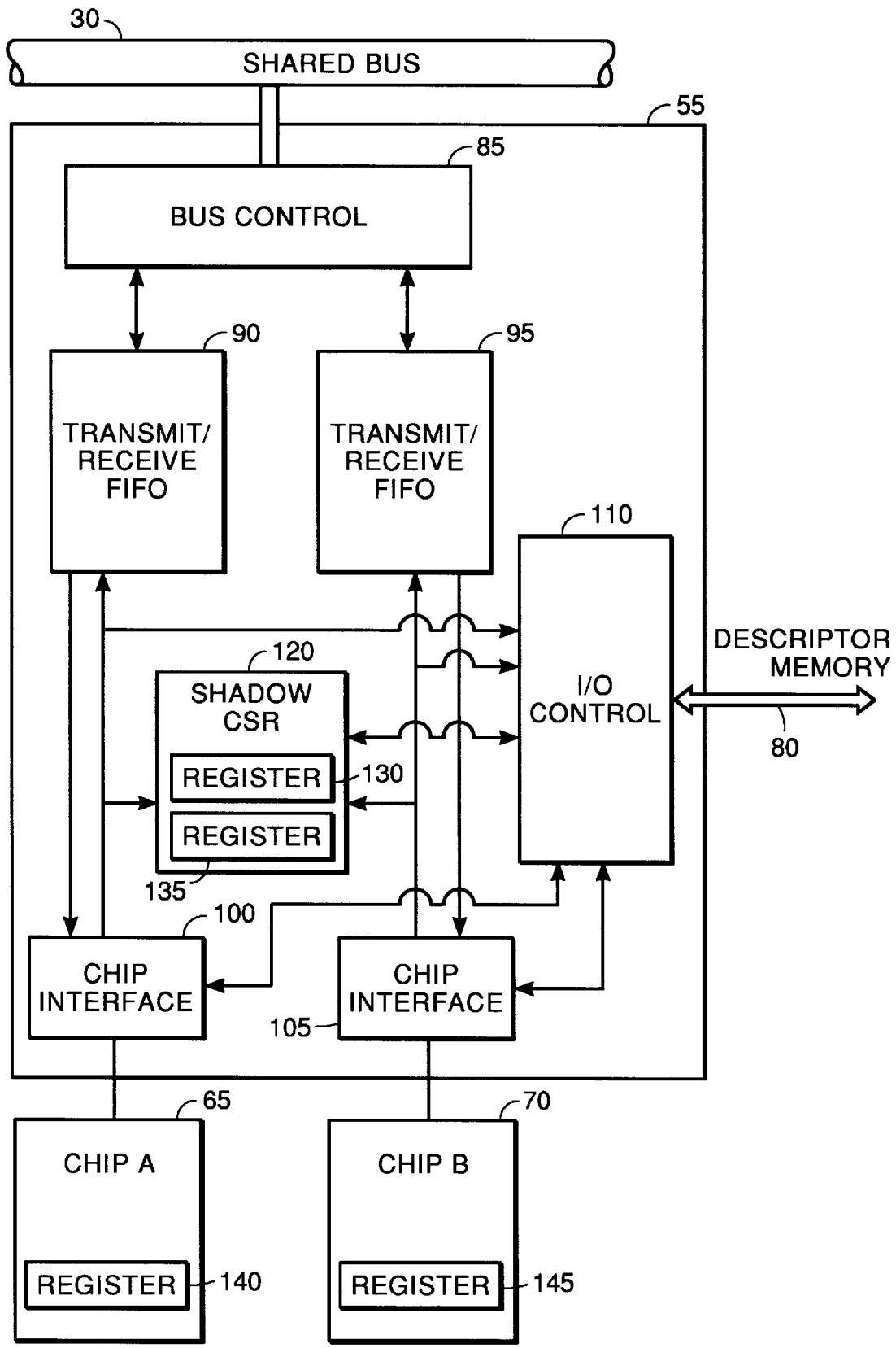
FIG. 4 is a transaction logic block.

FIG. 4 shows the details of the transaction logic block 55 shown in FIG. 1. The transaction logic block 55 may be implemented in a gate array chip, called a buffer interface gate array, and is connected to the shared bus 30 and to the network controller chip A 65 and network controller chip B 70. The transaction logic block 55 is also connected to the descriptor memory 60 although only the connection 80 is shown in FIG. 4.

The transaction logic block 55 has a bus control 85 which provides the interface between the transaction logic block 55 and the shared bus 30. The bus control 85 provides a bus master (or Direct Memory Access) machine for the shared data bus 30, implements bus protocol and determines the burst size for shared bus 30 write and read transactions. The bus control 85 also provides an interface for data reads and writes to transmit/receive FIFO's 90, 95 in the transaction logic block 55.

The transmit/receive FIFO's 90, 95 are first-in, first-out (FIFO) queues to buffer bus transactions for data bursts going through the transaction logic block 55 from the shared data bus 30, to and from the network controller chips 65, 70.

The network controller chip interfaces 100, 105 provide an interface between the transaction logic block 55 and the network controller chips 65, 70 by handling the moving of data and addresses between the network controller chips 65, 70 and other system memory including the shared memory 40, shown in FIG. 1, and the descriptor memory 60, shown in FIG. 1. The network controller chip interfaces 100, 105 perform high order address decodes on addresses from the network controller chips 65, 70 and determine whether a network controller chip access is intended for shared memory 40 or descriptor memory 60.

The input/output control 110 arbitrates between the components of the transaction logic block 55 and the descriptor memory 60. The input/output control 110 also allows the network controller chips 65, 70 to access the descriptor memory 60.

The shadow control status register (CSR) 120 contains two sets of registers 130, 135 corresponding to registers 140, 145 in the two network controller chips 65, 70. The speed differential between the shared bus 30 and the network controller chips 65, 70 is usually too great to allow data to be written to the network controller chips 65, 70 directly from the shared data bus 30. For example, a typical speed for a shared data bus may be 40 nsec/cycle and a typical speed for a network controller chip may be 800 $\mu$sec/cycle. The CSR 120 does the transformation between the fast cycle time of the high-speed bus 30 and the slow cycle time of the network controller chips 65, 70.

Figure 5:
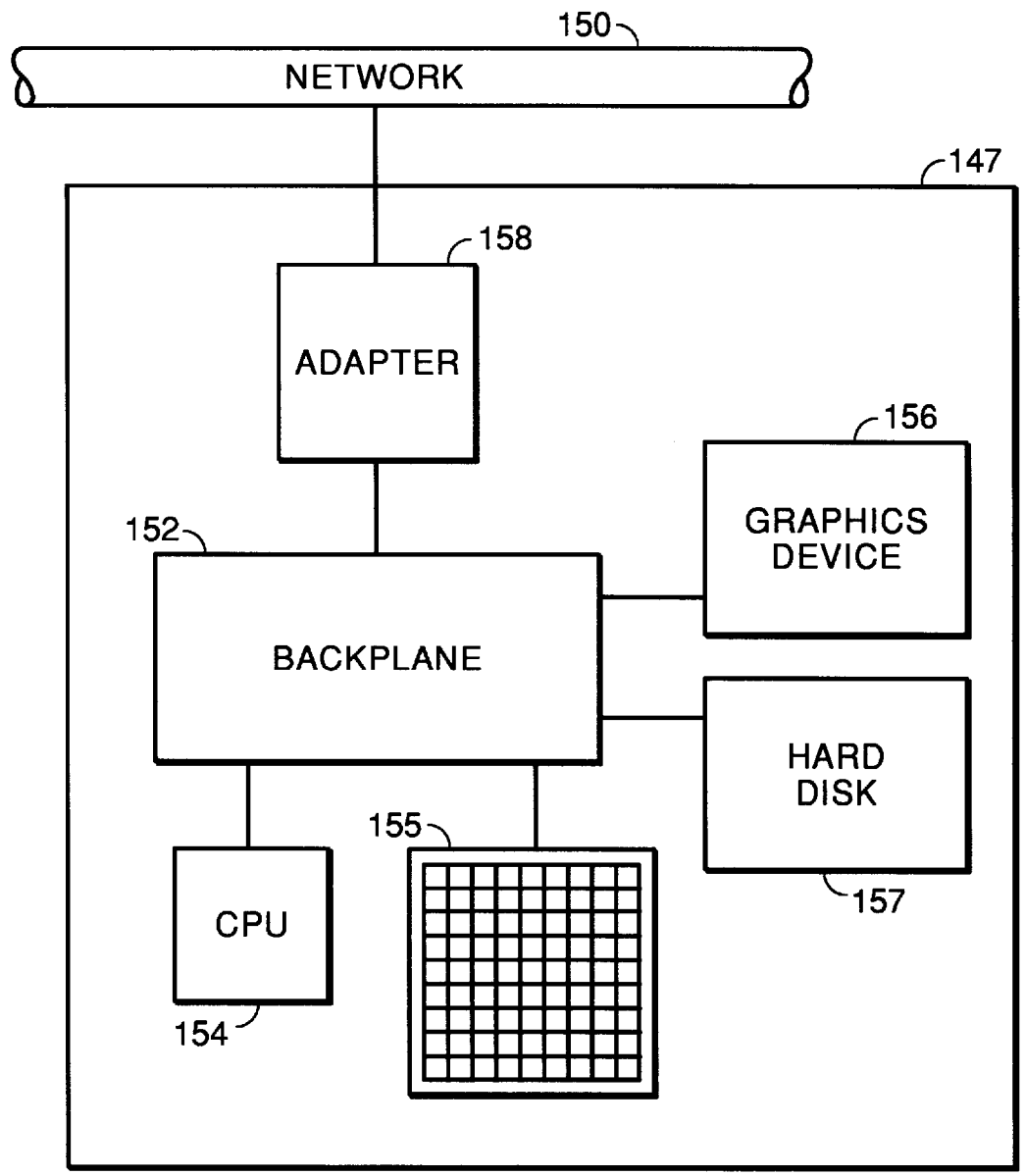
FIG. 5 shows a computer system connected to a network.

The network adapter described above may be used in a computer system on a network as shown in FIG. 5. FIG. 5 shows a computer 147 connected to a network 150. The computer 147 has a backplane bus 152 with a CPU 154, a memory 155, a graphic device 156, a hard disk 157 and an adapter 158. The adapter 158 interfaces with the network 150.

Figure 6:
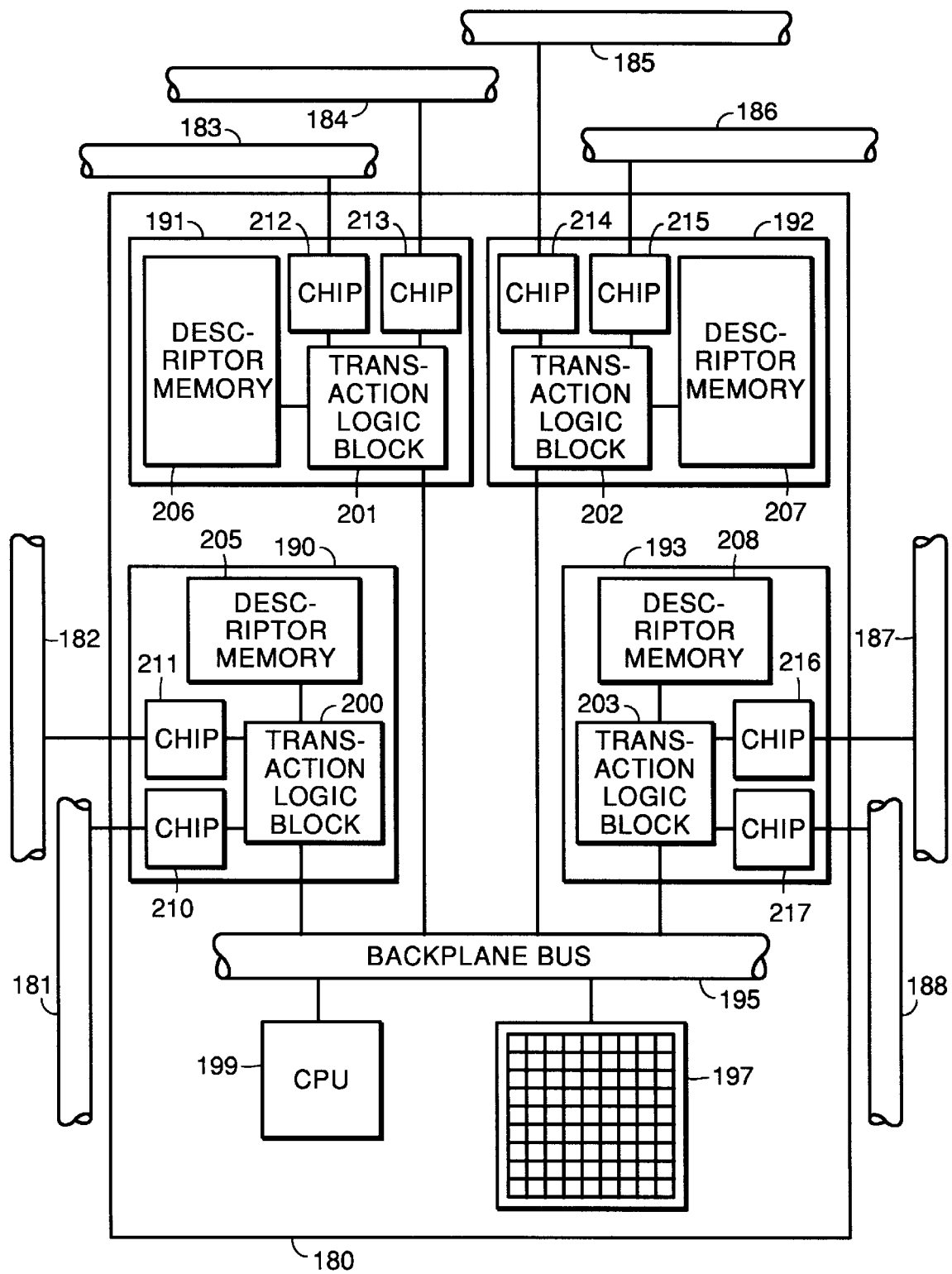
FIG. 6 shows an eight port bridge router.

The network adapter 158 described above may also be used in a system such as the eight port bridge router shown in FIG. 6. A computer 180 is connected to communications networks 181, 182, 183, 184, 185, 186, 187, 188. The computer 180 includes four network adapters 190, 191, 192, 193, a backplane bus 195, a memory 197 and a CPU 199.

The network adapters 190, 191, 192, 193 have transaction logic blocks 200, 201, 202, 203, descriptor memories 205, 206, 207, 208 and network controller chips 210, 211, 212, 213, 214, 215, 216, 217. The transaction logic blocks 200, 201, 202, 203 are interfaces to the backplane bus 195 for data transfers to and from the computer memory 197. The transaction logic blocks 200, 201, 202, 203 also interface to the descriptor memories 205, 206, 207, 208, which are local memories for buffer descriptors. The network adapters 190, 191, 192, 193 manage the transmission and reception of data packets from the networks 181, 182, 183, 184, 185, 186, 187, 188 and the computer memory 197 where the data packets are stored.

Figure 7:
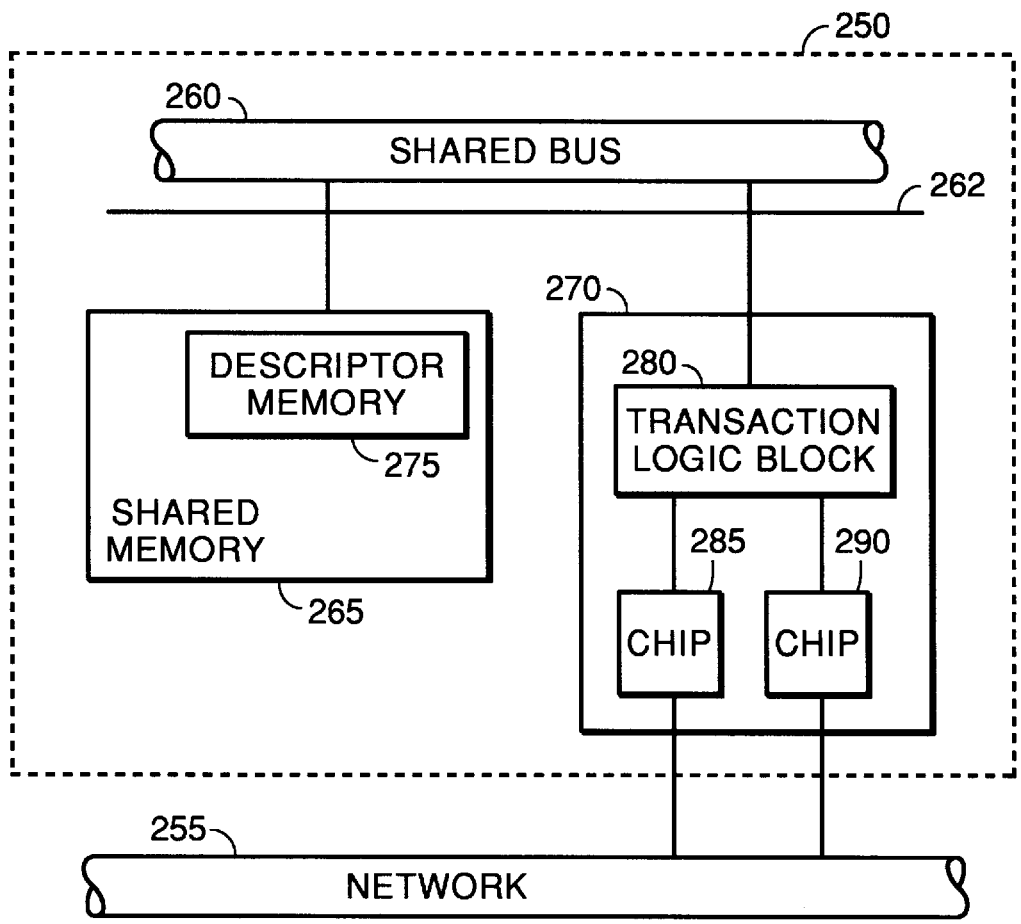
FIG. 7 is a second alternative embodiment of the invention.

A second alternative embodiment to the invention is shown in FIG. 7. FIG. 7 shows a subsystem 250 on a communications network 255. The subsystem 250 has a shared bus 260, a high priority line 262, a shared memory 265 and a network adapter 270. The shared memory 265 has a descriptor memory 275. The network adapter 270 has a transaction logic block 280 and network controller chips 285, 290.

The network adapter 270 manages the transmission and reception of data packets in the network 255 by transferring data packets between the network 255 and the shared memory 265, where the data packets are stored. The shared memory 265 also stores the buffer descriptors in the descriptor memory 275. In this embodiment of the invention, buffer descriptor transactions have high priority in the subsystem 250 while data transmit/receive transactions have lower priority. To transmit or receive a data packet, the network adapter 270 accesses, across the high priority line 262, each buffer descriptor of the data packet. Alternatively, high priority line 262 is used by adapter 270 to give fast access to shared bus 260. The network adapter 270 transfers, across the shared bus 260, at low priority, the data for the data packet from or to the shared memory 265. Then, the network adapter 270 updates, at high priority, using line 262, the buffer descriptor with the status.

In this embodiment, buffer descriptor access does require bus resources, but because buffer descriptor transactions involve small amounts of data, multiple buffer descriptor accesses do not overburden the system and the latency requirements imposed by the network controller chips 285, 290 are met. Also, fast access to the buffer descriptors is guaranteed by the priority subsystem including line 262.

Figure 8:
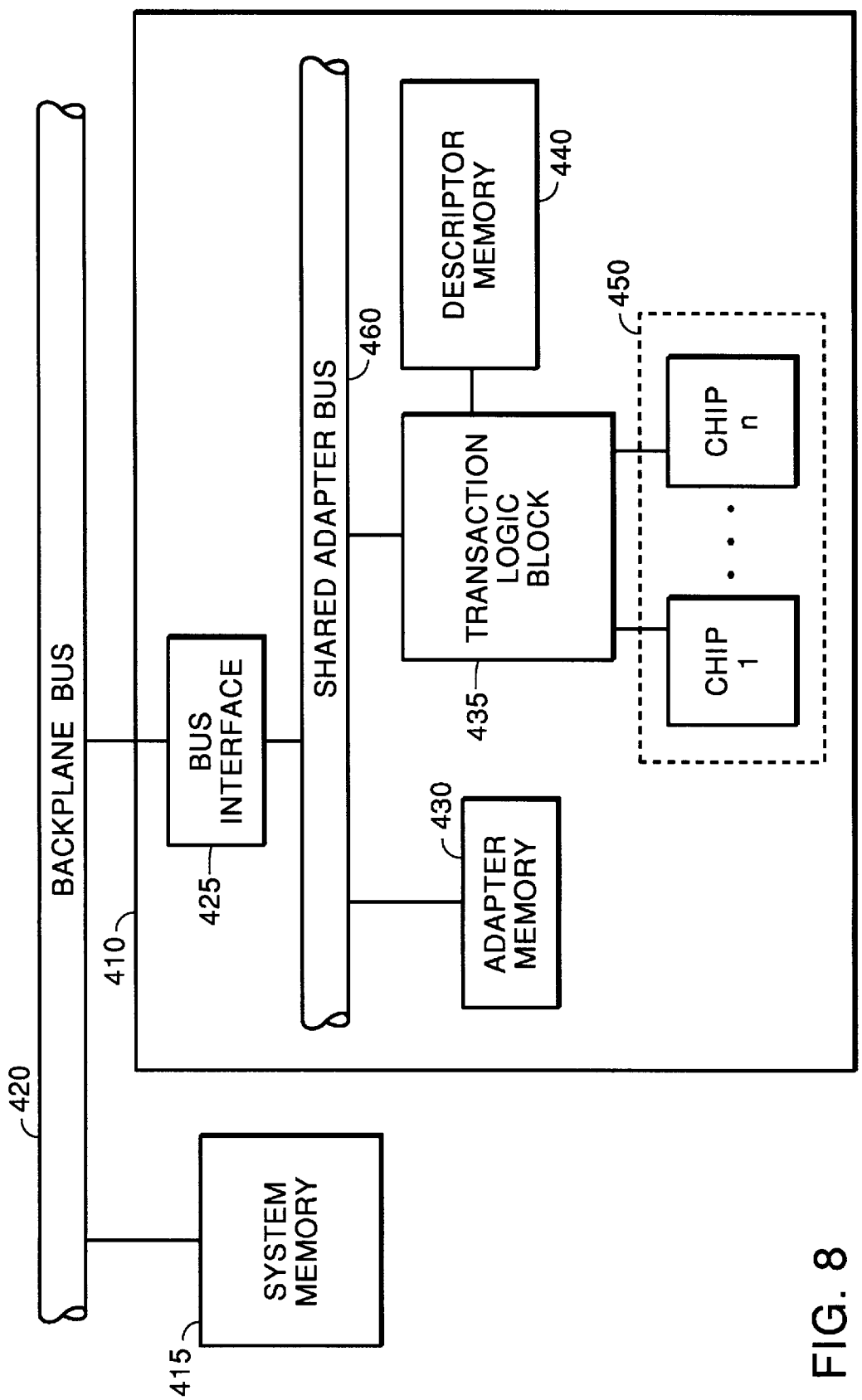
FIG. 8 is a third alternative embodiment of the invention.

A third alternative embodiment is shown in FIG. 8. FIG. 8 shows an adapter 410 connected to a system memory 415 by a backplane bus 420. The adapter 410 has a bus interface 425, an adapter memory 430, a transaction logic block 435, a descriptor memory 440, and network controller chips 1 through n 450 and a shared adapter bus 460. In this embodiment, the buffer descriptors are stored in the local descriptor memory 440. The adapter memory 430 provides short-term storage for data packets and the system memory 415 provides longer-term storage for data packets. The use of the descriptor memory 440 avoids latency delays in accessing buffer descriptors caused by latency of shared adapter bus 460.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for transmitting a data packet, comprising the steps of:

receiving at a network adapter a request for transmitting a data packet, said network adapter connected to a shared memory over a shared bus;

determining a transaction type in response to said request;

reading a buffer descriptor corresponding to a buffer in said shared memory from a descriptor memory in said network adapter in response to a buffer descriptor transaction type;

transmitting data stored in said buffer in said shared memory in response to said buffer descriptor read from said descriptor memory in said network adapter; and, updating said buffer descriptor in said descriptor memory with the status of said buffer, whereby said data packet is transmitted without accessing said buffer descriptor from said shared memory.

2. A method for receiving a data packet, comprising the steps of:

receiving at a network adapter a data packet, said network adapter connected to a shared memory over a shared bus;

determining a transaction type by reading a field of said data packet;

writing a buffer descriptor into a descriptor memory in said network adapter in response to a buffer descriptor transaction, said buffer descriptor corresponding to a buffer in said shared memory;

writing data to said buffer in said shared memory in response to a data transaction, updating said buffer descriptor in said descriptor memory with the status of said buffer; and whereby the data packet is written to said shared memory while said buffer descriptor is stored only in said descriptor memory in said network adapter.

3. An apparatus for transmitting and receiving a data packet, comprising:

a shared memory for storing a data packet, said shared memory having a plurality of buffers;

a descriptor memory in an adapter for storing a plurality of buffer descriptors, said plurality of buffer descriptors corresponding to said plurality of buffers in said shared memory; and, a transaction logic block coupled to said descriptor memory, said transaction logic block connected to said shared memory by a shared bus, said transaction logic block for determining a transaction type in response to a data request, said transaction logic block directing a data transaction to said shared memory, said transaction logic block directing a buffer descriptor transaction to said descriptor memory in said adapter, wherein said buffer descriptors in said descriptor memory are updated with the status of said buffers;

whereby a data transaction may be accomplished by reading a buffer descriptor only stored in said descriptor memory in said adapter in response to said data request.

4. An apparatus as in claim 3 further comprising:

a network controller chip connected to said transaction logic block, said network controller chip for receiving said data request from a communications network and transmitting said data request to said transaction logic block.

5. An apparatus as in claim 4 further comprising:

a plurality of network controller chips.

6. An apparatus as in claim 3 wherein said buffer descriptor has a plurality of fields.

7. An apparatus as in claim 3 wherein said buffer descriptor has a data type field, a data length field and a data location field.

8. An apparatus as in claim 3 wherein said shared memory is associated with a computer CPU and said shared bus is a backplane bus.

9. An apparatus for transmitting and receiving a data packet, comprising:

- a shared memory for storing a data packet, said shared memory having a plurality of buffers; and,
- a plurality of network adapters connected to said shared memory by a backplane bus;
- a descriptor memory in at least one of said plurality of network adapters for storing a plurality of buffer descriptors corresponding to said plurality of buffers in said shared memory;
- at least one network controller chip in said network adapter, said at least one network controller chip receiving a data request from a network; and,
- a transaction logic block in said network adapter for determining a transaction type in response to said data request, said transaction logic block directing a data transaction type to said shared memory, said transaction logic block directing a buffer descriptor transaction type to said descriptor memory, wherein said buffer descriptors in said descriptor memory are updated with the status of said buffers;
- whereby a data transaction may be accomplished by reading a buffer descriptor only stored in said descriptor memory in said one of said plurality of network adapters in response to said data request.

10. A method for transmitting a data packet from an I/O device having a local memory for storing buffer descriptors and a system shared memory having data buffers, the data buffers for storing data packets, the local memory and the system shared memory connected by a shared bus, comprising the steps of:

- receiving at a network adapter in the I/O device a request for transmitting a data packet;
- reading a buffer descriptor from the local memory in the I/O device in response to a buffer descriptor transaction type, said buffer descriptor corresponding to a buffer in the system shared memory;
- transmitting data stored in the data buffers of the shared memory in response to said buffer descriptor read from the local memory; and,
- updating said buffer descriptor in the local memory,
- whereby said data packet is transmitted without accessing said buffer descriptor from said shared memory.

11. A method for receiving a data packet at an I/O device having a local memory for storing buffer descriptors and a system shared memory having data buffers, the data buffers for storing data packets, the local memory and the system shared memory connected by a shared bus, comprising the steps of:

- receiving a data packet at a network adapter in the I/O device;
- determining a transaction type by reading a field of said data packet;
- writing a buffer descriptor into the local memory in response to a buffer descriptor transaction;
- writing data to a buffer in the system shared memory in response to a data transaction, updating said buffer descriptor in said descriptor memory with the status of said buffer; and
- whereby said data packet is received and written to the system shared memory without accessing said buffer descriptor from said shared memory.

* * * * *